United States Patent [19]
Potter

[11] 4,296,540
[45] Oct. 27, 1981

[54] METHOD FOR SEALING A DRYER

[75] Inventor: George R. Potter, Coos Bay, Oreg.

[73] Assignee: Burley Industries, Inc., Coos Bay, Oreg.

[21] Appl. No.: 192,244

[22] Filed: Sep. 30, 1980

Related U.S. Application Data

[63] Continuation-in-part of Ser. No. 971,845, Dec. 21, 1978, abandoned.

[51] Int. Cl.³ .......................... B23P 3/00; B23P 19/04
[52] U.S. Cl. .................................... 29/460; 52/309.5; 52/744; 34/9.5; 34/16.5; 34/242; 264/46.5; 264/261; 277/1
[58] Field of Search ................. 29/460, 450, 453, 405; 34/9.5, 16.5, 242; 249/90; 52/309.4, 309.5, 309.6, 232, 467, 744; 264/46.5, 261, 263; 425/123, DIG. 817; 277/1

[56] References Cited
U.S. PATENT DOCUMENTS

| | | | |
|---|---|---|---|
| 1,789,642 | 1/1931 | Wirth | 264/263 |
| 2,392,734 | 1/1946 | Haberstump | 264/263 X |
| 3,125,346 | 3/1964 | Poltorak | 277/1 |
| 3,439,406 | 4/1969 | Wallin | 277/1 X |
| 3,451,696 | 6/1969 | Hagelin et al. | 264/46.5 X |
| 3,471,178 | 10/1969 | Roe | 264/261 X |
| 3,481,642 | 12/1969 | Bonallack et al. | 52/309.5 X |
| 3,583,118 | 6/1971 | Lowery | 264/46.5 X |
| 3,865,914 | 2/1975 | Nahr | 264/263 X |
| 4,069,631 | 1/1978 | Nahr | 52/309.5 |
| 4,090,294 | 5/1978 | Parr | 264/263 X |

Primary Examiner—Charlie T. Moon
Attorney, Agent, or Firm—Chernoff & Vilhauer

[57] ABSTRACT

A method for sealing a dryer against leakage of hot gases from within the dryer through joints between adjacent panels enclosing the interior of the dryer. The method comprises fastening respective elongate enclosing members into abutment with mutually adjacent pairs of panels along the joints between them so as to form respective enclosures between the enclosing members and the panels at such joints. Thereafter, at a temperature less than the operating temperature of the dryer, a heat-resistant, gas-impermeable closed cell foam is injected into the enclosures through spaced perforations in the enclosing members so as to substantially fill the enclosures. Thereafter, when the veneer dryer is operated at its normal elevated operating temperature, the temperature of the closed cell foam is thereby increased so as to expand the foam within the enclosures into tight sealing abutment with the joints to prevent gas leakage therethrough.

12 Claims, 6 Drawing Figures

U.S. Patent    Oct. 27, 1981    Sheet 1 of 2    4,296,540
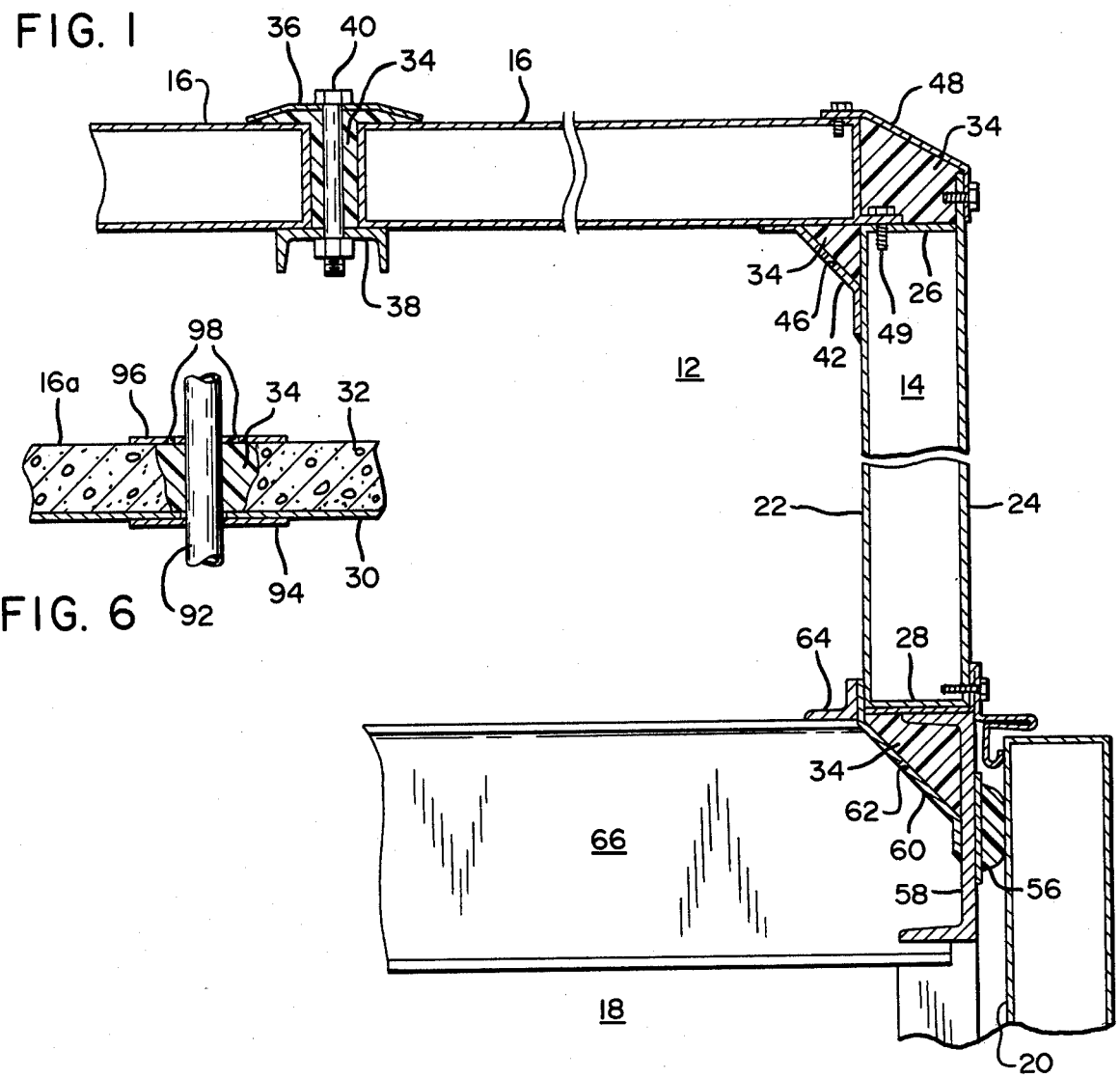
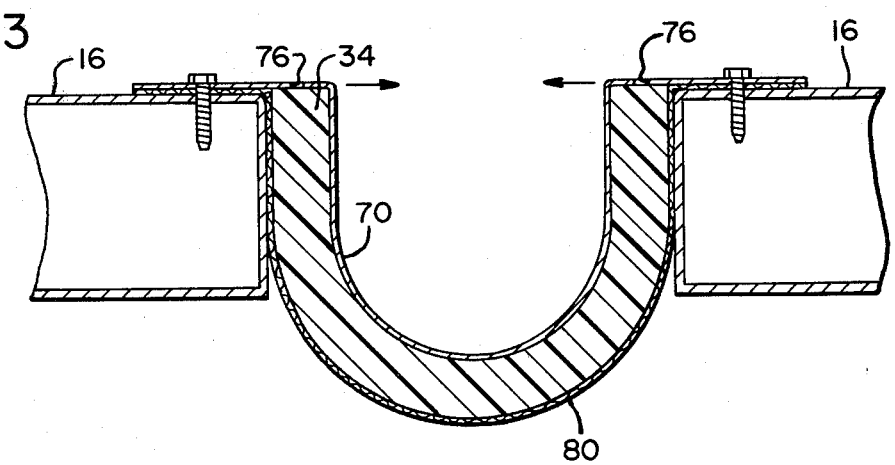

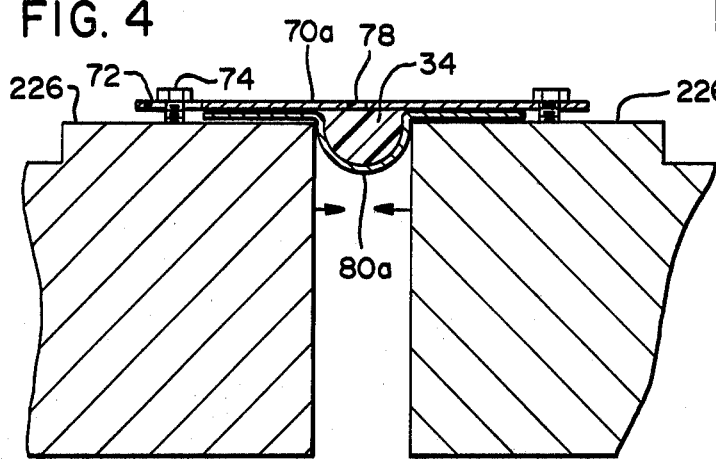
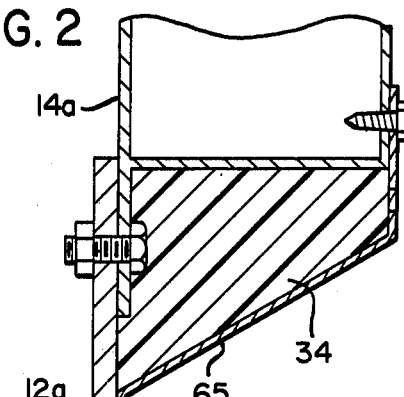
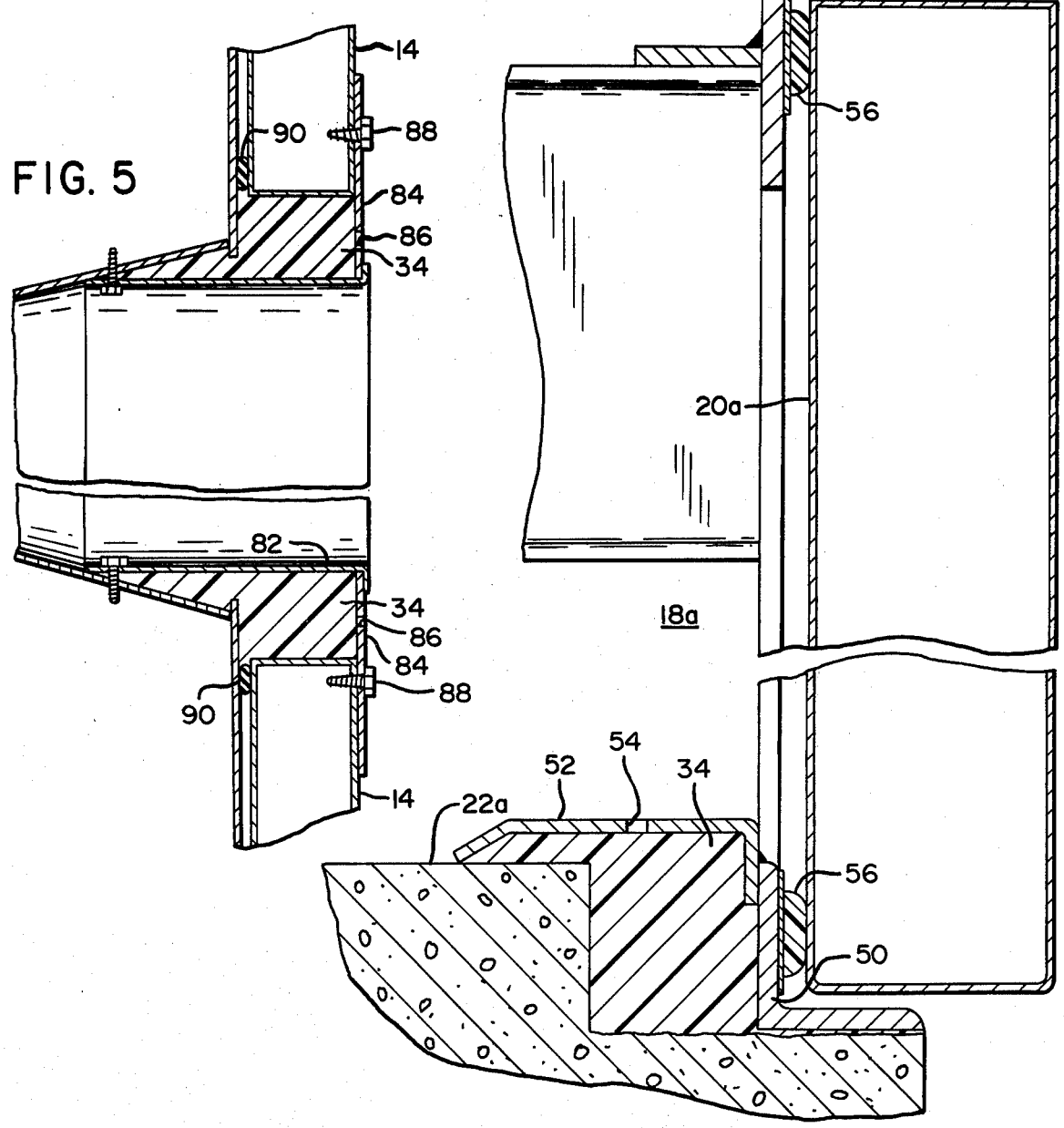

4,296,540

METHOD FOR SEALING A DRYER

CROSS-REFERENCE TO RELATED APPLICATIONS

This application is a continuation-in-part of my copending application Ser. No. 971,845, filed Dec. 21, 1978 now abandoned.

BACKGROUND AND SUMMARY OF THE INVENTION

This invention relates to a method for sealing the joints between adjacent panels of a dryer, such as a veneer dryer, against the escape of hot gases from within the dryer.

Dryers, such as those used to dry wood veneers, generally comprise large chambers formed of multiple panels. Veneer is passed through the dryer and is heated to drive moisture from the wood, the temperature within a veneer dryer being in the neighborhood of 350° F. At this temperature, and at the elevated pressures found within a dryer, the moisture driven from the wood remains substantially in a vapor state and has a tendency to leak through spaces between adjoining panels in the dryer. Such moisture, which includes water vapor, hydrocarbons and acidic materials, experiences a drastic lowering of temperature as it leaks from the interior of the dryer toward the outside of the panels causing it to condense on the panels in the regions of the leaks. The condensed moisture corrodes or deteriorates the panels, producing larger gaps between the panels and allowing greater leakage. This increases fugitive emissions from the dryers which are objectionable and often are in violation of environmental control standards. Moreover, the performance and energy efficiency of the dryer are decreased by the leakage, and thus the dryer's cost of operation is increased.

The problem of attempting to seal such dryers against leakage is primarily in making the seals tight enough that they can effectively resist the leakage of the hot, pressurized gas from within the dryer to the ambient low temperature and low pressure areas outside the dryer. This problem is aggravated by the fact that each dryer contains not only a large number of joints between panels, but also joints of many different configurations between different types of panels, such as between roof panels and side panels, between side panels and door panels, and between door panels and floor panels. Moreover there are also joints between panels and members which penetrate the panels, such as pipes and air ducts. Some dryers also have joints of the expansion type, wherein two panels are movable toward and away from each other in response to temperature variations.

Accordingly the principal object of the present invention is to provide a method for sealing dryers, especially veneer dryers, which overcomes the problems set forth above.

More specifically, an object of the present invention is to provide a method for sealing the joints between adjacent panels of a dryer against leakage of hot, pressurized gases from within the dryer through such joints.

A still more specific object of the present invention is to provide a method for sealing such joints which can be applied to existing, fully-assembled dryers by structural modification of such dryers while they remain in the assembled state, and which is well adapted for sealing the various different types of joints described above.

A principal feature of the invention is to employ a heat-resistant, gas-impermeable closed cell foam as a sealing material and to utilize the heat generated by operation of the dryer to expand the closed cell foam after installation and curing thereof to tighten the seals and thereby complete the sealing of the dryer.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a partial cross-sectional view of the upper portion of an exemplary veneer dryer sealed in accordance with the present invention.

FIG. 2 is a partial cross-sectional view of the lower portion of a slightly different exemplary veneer dryer sealed in accordance with the present invention.

FIG. 3 is a cross-sectional view of an exemplary dryer expansion joint sealed in accordance with the present invention.

FIG. 4 is a cross-sectional view of a different exemplary dryer expansion joint sealed in accordance with the present invention.

FIG. 5 is a cross-sectional view of an exemplary joint between a fan duct and a side panel of a dryer, sealed in accordance with the present invention.

FIG. 6 is a cross-sectional view of an exemplary joint between a conduit and a roof panel of a dryer, sealed in accordance with the present invention.

DETAILED DESCRIPTION OF THE INVENTION

As is well known to the art, veneer dryers are elongate, generally rectangular enclosures having a lower chamber through which wood veneers travel along the length of the dryer on a conveyor and an upper chamber through which the drying gases are recirculated by blowers and heated. The dryer is formed of a framework of structural steel members such as channels, angles and I-beams upon which are mounted a multiplicity of planar panels connected to each other at respective elongate joints extending along respective mutually adjacent edges of the panels. The panels confine the hot dryer gases, usually at temperatures approximately in the range of 350° F. or higher and at elevated pressures, against leakage from the dryer chambers to the ambient environment exterior of the dryer.

With reference to FIG. 1, the upper dryer chamber designated as 12 is separated from the ambient environment primarily by upright side panels such as 14 and horizontal roof panels 16, while the lower chamber 18 is confined by upright door panels such as 20 and horizontal floor panels (not shown in FIG. 1). FIG. 2 shows a slightly different type of exemplary veneer dryer having an upper chamber 12a with side panels such as 14a and a lower chamber 18a formed by upright door panels such as 20a and floor panels such as 22a.

The construction of the various panels referred to herein is determined by the dryer manufacturer, most of the panels normally being constructed of sheet metal. For example panel 14 of FIG. 1 consists of an inner sheet of metal 22 and an outer sheet of metal 24 spaced apart and connected by edge surfaces 26 and 28 forming an envelope, the interior of which may either be empty or filled with an appropriate thermal insulation such as fiberglass insulation (not shown). Roof panels 16 and door panels 20 and 20a may be of similar construction. Alternatively, roof panels may take the form of panel 16a shown in FIG. 6 which features only an inner sheet of metal 30, the outer surface of which is covered with a castable cementitious material 32 as is well known to the art. Floor panels may be either of concrete, as shown in FIG. 2 with respect to floor panel 22a, or of metal as shown in FIG. 4 with respect the floor panel 22b.

The different types of joints which will normally be present in conventional dryers and which therefore will require sealing may be classified as follows:
(1) a joint between a mutually adjacent pair of panels occupying the same plane (such as the joint between roof panels 16 in FIG. 1);
(2) a joint between a mutually adjacent pair of panels occupying angularly intersecting planes (such as the joint between panels 14 and 16 of FIG. 1, or 20a and 22a of FIG. 2);
(3) a joint between mutually adjacent panels occupying substantially parallel planes spaced apart from each other in offset relationship (such as the joint between panels 14 and 20 of FIG. 1);
(4) expansion joints between mutually adjacent pairs of panels occupying the same plane (as shown in FIGS. 3 and 4);
(5) joints between panels and penetrating members (as shown in FIGS. 5 and 6).

A great advantage of the sealing method of the present invention, which makes it economically feasible to seal existing dryers, is that the method utilizes certain basic steps which are uniformly applicable to the sealing of joints between mutually adjacent panels regardless of the type of joint involved. These steps include fastening respective elongate enclosing members, perforated by apertures spaced along their lengths, into abutment with mutually adjacent pairs of panels along the joints between the panels such that each enclosing member bridges a respective joint and forms an enclosure between the respective enclosing member and the respective pair of panels, the interior of the enclosure being exposed to the respective joint between the panels. After the enclosures are thus formed, and while the dryer is not operating so that the temperature is less than the dryer's elevated operating temperature (e.g. at ambient temperature), the heat-resistant, gas-impermeable closed cell foam is injected into the enclosures through the apertures in the enclosing members in such quantity that the enclosures are substantially filled with the closed cell foam. This foam material is indicated as 34 in all of the figures. A brand of material which has been found to work well in this application is Dow Corning 3-6548 silicone RTV foam. This material is a medium density, two-part curable silicone foam product having two components which, when mixed, may be injected into the enclosures and will expand and cure to a closed cell, gas-impervious foamed elastomer having heat-resistant properties. Thereafter, upon operation of the dryer at its normal elevated operating temperature, the closed cell foam material will expand due to expansion of the gas within the closed cells thereof and will tightly fill the enclosures thereby tightly sealing the joints to prevent leakage of the hot gases from within the dryer. Without such heat-caused expansion of the closed cell foam within the enclosures, a sufficiently tight seal to prevent the escape of gases through the joints would not be obtainable. When the dryer is not operating, the temperature of the foam decreases and it contracts, thereby relieving the tight seals; however this poses no problem since the seals are not necessary except when the dryer is operating.

With respect to the variations of the above-described basic methodology involved in sealing the different types of joints outlined above, the type of joint wherein a mutually adjacent pair of panels occupy the same plane as shown between roof panels 16 of FIG. 1 will first be discussed. In this case an outer enclosing member 36 and an inner enclosing member 38 are employed, each being fastened by bolts such as 40 into abutment with opposing sides of the panels 16 so as to bridge the joint between the panels and form the required enclosure. Each of the enclosing members 36 and 38 is of elongate shape having a length coextensive with that of the joint between the panels 16. The enclosing member 36 is perforated by apertures (not shown) of approximately one-fourth inch diameter spaced along the length of the enclosing member at intervals of 6–12 inches through which the foam material 34 may be injected.

With respect to the sealing of a joint between a mutually adjacent pair of panels occupying angularly intersecting planes, the joint between side panel 14 and roof panel 16 in FIG. 1 exemplifies the approach used. An elongate enclosing member 42 perforated with spaced apertures such as 46 in the manner previously described and of a length coextensive with the joint is stitch-welded at regularly spaced intervals to the inner sides of panels 14 and 16 respectively so as to bridge the included or interior angle between the panels and thereby form the necessary enclosure into which the foam 34 can be injected through the apertures. Although it is less critical to the sealing objective to likewise form an enclosure bridging the exterior angle between the panels 14 and 16 by means of a perforated enclosing member such as 48, such additional step does enhance the sealing by its placement on the opposite side of the joint and, in addition, provides a foamed enclosure exposed to, and thereby sealing, fastener screws such as 49 which structurally hold the respective panels together and through which some leakage might occur if the fasteners were not so sealed.

A different type of joint wherein a mutually adjacent pair of panels likewise occupy angularly intersecting planes is that between floor panel 22a and door panel 20a as shown in FIG. 2. For purposes of the description and claims herein, door panels such as 20a will be deemed to include their frames such as 50 (FIG. 2) since the frame is simply an extension of the door panel whose presence permits the door panel to be opened without adversely affecting the structural integrity of the dryer. In this case the elongate enclosing member 52, perforated with apertures such as 54 in the manner described above and longitudinally coextensive with the joint, is welded to the frame 50 of the door panel 20a and bridges the included angle between the door panel and the floor panel 22a, thereby forming the required enclosure into which the foam 34 is injected through the apertures such as 54. An interesting aspect of this particular joint is that, since the floor panel 22a is nonmetallic, the enclosing member 52 is held in abutment with the floor member 22a only by means of the welded connection to the door frame 50. By pressing the enclosing member 52 into abutment with the floor panel 22a while welding the enclosing member to the door frame 50, an adequate enclosure for foaming purposes is formed.

It should be noted that, as part of the sealing method of the present invention, the sealing of the openable door panels 20a may be completed by mounting a continuous sealing strip 56 around the entire frame of the door panel against which the door panel will press when closed. The strip includes a heat-resistant elastomeric core of silicone having a planar mounting surface and a rounded sealing surface. Preferably the core is encased in an elastically deformable sheath of heat-insulative fiberglass cloth material impregnated with silicone, the sheath including front and back covering portions which cover the sealing and mounting surfaces of the core respectively.

A typical joint of the type between mutually adjacent panels occupying substantially parallel planes spaced apart (or offset) from each other is depicted by the joint between panel 14 and door panel 20 in FIG. 1. Here again, the door frame 58 is considered to be part of the door panel 20. An elongate enclosing member 60, perforated by spaced apertures such as 62 and longitudinally coextensive with the joint, is stitch-welded to the door frame 58 and extends transversely therefrom at an angle with respect to the offset parallel planes of the two panels into abutment with the inside surface of the panel 14, forming the necessary enclosure into which the foam 34 may be injected through the apertures such as 62. An alternative means of holding the enclosing member 60 into abutment with the inside surface of the panel 14 is shown comprising an elongate angle member 64 whose length is coextensive with the enclosing member 60 which presses the enclosing member 60 against the inside surface of the panel 14 and is welded to the tops of the respective transverse I-beams such as 66 of the dryer frame. This type of construction may be used where direct welding of an enclosing member to a panel is difficult because of inaccessibility of the location, the danger of burning through the skin of a panel during the welding process, or similar problems. FIG. 2 shows the use of an enclosing member 65 to form an exterior seal at a location comparable to that of the interior seal formed by the enclosing member 60 just described, the exterior seal being dictated by the different relationship between panel 14a and door panel 20a.

Two types of expansion joints, i.e. between mutually adjacent pairs of panels occupying the same plane which are movable toward and away from each other due to thermal expansion and contraction, are shown in FIGS. 3 and 4 respectively. Each joint includes an outer elongate perforated enclosing member 70 and 70a respectively, longitudinally coextensive with the joint and fastened into abutment with the pair of panels so as to permit movement of the panels toward and away from each other. In the joint of FIG. 3, such movement is permitted due to the flexibility of the thin metal enclosing member 70, while in FIG. 4 such movement is permitted due to the slotted aperture 72 through which a bolt 74 is loosely fastened so as to permit sliding of the member 70a with respect to the bolt 74. Each of the enclosing members 70 and 70a is perforated with longitudinally spaced apertures 76, 78 respectively in the manner previously described. Each joint further includes an inner enclosing member 80, 80a respectively whose length is coextensive with the length of the joint and with that of the respective outer enclosing member respectively. Each flexible inner enclosing member is fastened into the variable-width gap between the panels such that the inner enclosing member movably bridges the gap. As shown in FIG. 3, the flexible inner enclosing member 80 is constructed of asbestos cloth, while in FIG. 4 the inner enclosing member 80a is constructed of thin, flexible sheet metal. The enclosure between the two enclosing members of each expansion joint is injected with the expansible and contractible foam 34 through the respective apertures 76 and 78 thereby forming a variable-width seal adaptable to the variable-width gap of the joint.

FIG. 5 illustrates the method of sealing the surrounding joint between a penetrating fan duct 82 and a panel 14 through which it extends. An enclosing collar 84 having radially spaced apertures 86 therein is fastened by screws 88 in surrounding relationship to the fan duct 82 and in abutment with the surrounding panel 14 such that the collar bridges the joint between the duct 82 and panel 14 and forms a surrounding enclosure into which the foam 34 may be injected through the apertures 86. If necessary, asbestos rope seals such as 90 may be installed prior to installation of the collar 84 to complete the foaming enclosure.

FIG. 6 depicts the sealing of a joint between a penetrating pipe 92 or similar conduit and a roof panel 16a of the type covered with a castable cementitious material 32. In such case, a portion of the castable cementitious material 32 is chipped away around the pipe 92, after which an inner collar 94 and an outer collar 96 perforated with apertures 98 are installed and the foam 34 is injected through the apertures 98 into the resultant enclosure surrounding the pipe 92.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

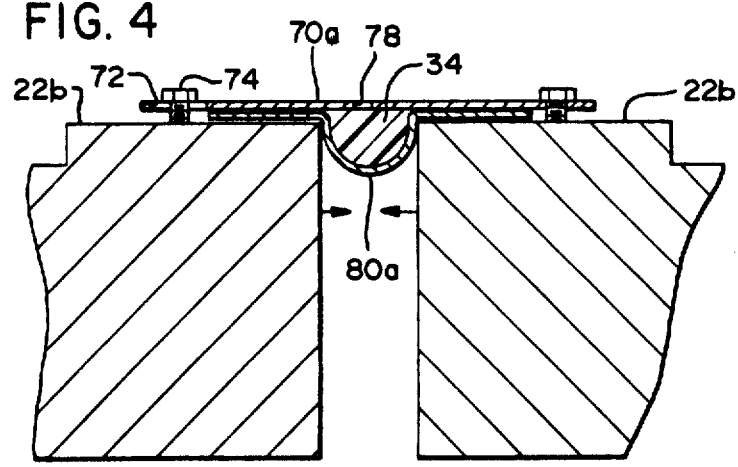

What is claimed is:

1. A method for sealing a veneer dryer, having a chamber defined by planar panels connected to each other at respective elongate joints extending along respective mutually adjacent edges of said panels for confining gas at a dryer operating temperature exceeding the ambient temperature outside the chamber, against leakage of said gas from said chamber, said method comprising:
   (a) while said panels are connected to each other, fastening respective elongate enclosing members into abutment with mutually adjacent pairs of said panels along said respective joints such that each of said enclosing members bridges and is longitudinally coextensive with a respective one of said joints and thereby forming respective enclosures between said enclosing members and said panels, the interiors of said respective enclosures being exposed to respective ones of said joints;
   (b) injecting into said enclosures, at a temperature less than said dryer operating temperature, a heat-resistant, gas-impermeable closed cell curable foam in such quantity that said enclosures are substantially filled with said closed cell foam;
   (c) permitting said foam to cure; and
   (d) thereafter operating said dryer at said dryer operating temperature and thereby increasing the temperature of said closed cell foam so as to expand said foam within said enclosures into tight sealing abutment with said joints to prevent leakage of said gas from said chamber through said joints.

2. The method of claim 1 wherein a mutually adjacent pair of said panels occupy the same plane and wherein said step (a) comprises fastening one of said elongate enclosing members into abutment with first sides of said pair of panels so as to bridge the joint between them and fastening a further one of said enclosing members into abutment with the opposite sides of said pair of panels so as to bridge the joint between them.

3. The method of claim 1 wherein a mutually adjacent pair of said panels occupy angularly intersecting planes and wherein said step (a) includes fastening one of said elongate enclosing members into abutment with said pair of panels so as to bridge the interior angle between said panels.

4. The method of claim 3 wherein said step (a) further includes fastening a second one of said elongate enclosing members into abutment with said pair of panels so as to bridge the exterior angle between said pair of panels.

5. The method of claim 1 wherein said step (a) comprises rigidly connecting one of said elongate enclosing members only to a first panel of a mutually adjacent pair of said panels and holding the enclosing member in abutment with the second of said pair of panels without likewise rigidly connecting the enclosing member to said second of said pair of panels.

6. The method of claim 5 wherein said first panel comprises a metallic panel and said second panel comprises a nonmetallic floor panel of said chamber occupying a plane angularly intersecting the plane of said first panel, said one of said elongate enclosing members being metallic and said step (a) including welding the enclosing member to said first panel while simultaneously pressing the enclosing member into abutment with said second panel.

7. The method of claim 1 wherein a mutually adjacent pair of said panels occupy respective substantially parallel planes spaced apart from each other in offset relationship, said step (a) comprising fastening one of said enclosing members into abutment with a pair of sides of said pair of panels, said enclosing member extending transversely at an angle with respect to said respective parallel planes.

8. The method of claim 1 wherein a mutually adjacent pair of said panels occupy the same plane and are movable, during operation of said veneer dryer, toward and away from each other so as to alternately widen and narrow a gap existing between said pair of panels at the joint between them, said step (a) comprising fastening a first one of said elongate enclosing members into abutment with said pair of panels such as to permit movement of said panels toward and away from each other and further comprising fastening a flexible second elongate enclosing member longitudinally coextensive with said first elongate enclosing member into said gap between said panels such that said second enclosing member flexibly bridges said gap.

9. The method of claim 1 wherein at least one of said panels contains a penetrating member extending through both sides thereof forming a joint between said penetrating member and said panel which surrounds said penetrating member, further including placing an enclosing collar in surrounding relationship to said penetrating member and in abutment with said panel such that said collar bridges the joint between said penetrating member and said panel and forms a surrounding enclosure around said penetrating member between said collar, said penetrating member and said panel, the interior of said surrounding enclosure being exposed to said joint between said penetrating member and said panel, injecting into said surrounding enclosure, at a temperature less than said dryer operating temperature, a heat-resistant, gas-impermeable closed cell curable foam in such quantity that said surrounding enclosure is substantially filled with said closed cell foam, permitting said foam to cure and thereafter operating said dryer at said dryer operating temperature and thereby increasing the temperature of said closed cell foam so as to expand said foam within said surrounding enclosure into tight sealing abutment with said joint between said penetrating member and said panel.

10. The method of claim 9, further including removing a portion of said panel surrounding said penetrating member prior to the injection of said foam into said surrounding enclosure.

11. The method of any one of claims 1 through 10 wherein a mutually adjacent pair of said panels include fasteners inserted therethrough at portions thereof adjacent the joint between said pair of panels for fastening said panels together, said step (a) further including fastening one of said elongate enclosing members into abutment with said pair of panels such that the interior of the enclosure formed thereby is exposed to said fasteners.

12. The method of any one of claims 1 through 10 wherein at least some of said elongate enclosing members have apertures formed therein at spaced locations along their lengths, said step (b) comprising injecting said closed cell foam into said enclosures through said apertures.

* * * * *

UNITED STATES PATENT AND TRADEMARK OFFICE
CERTIFICATE OF CORRECTION

PATENT NO. : 4,296,540

DATED : October 27, 1981

INVENTOR(S) : George R. Potter

It is certified that error appears in the above—identified patent and that said Letters Patent are hereby corrected as shown below:

FIG. 4 of the drawings, should read as per attached.

Signed and Sealed this

Fifth Day of October 1982

[SEAL]

Attest:

Attesting Officer

GERALD J. MOSSINGHOFF

Commissioner of Patents and Trademarks